US010442374B2

(12) United States Patent
Kondo et al.

(10) Patent No.: US 10,442,374 B2
(45) Date of Patent: Oct. 15, 2019

(54) VEHICLE-USE STORAGE BATTERY SYSTEM

(71) Applicant: KABUSHIKI KAISHA TOSHIBA, Minato-ku, Tokyo (JP)

(72) Inventors: Atsumi Kondo, Tokyo (JP); Kazuto Kuroda, Tokyo (JP); Tatsuya Arai, Tokyo (JP); Masaki Sato, Tokyo (JP); Akinobu Nishikawa, Tokyo (JP); Shinichiro Kosugi, Yokohama Kanagawa (JP); Masahiro Sekino, Tokyo (JP); Hideaki Yasui, Tokyo (JP); Mai Honda, Tokyo (JP); Masahiro Kurosu, Tokyo (JP); Kotaro Ogawa, Tokyo (JP); Tomonao Takamatsu, Kawasaki Kanagawa (JP); Mitsunobu Yoshida, Kawasaki Kanagawa (JP); Takafumi Nakahama, Tokyo (JP); Akihiko Ujiie, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 194 days.

(21) Appl. No.: 15/512,693

(22) PCT Filed: Dec. 9, 2014

(86) PCT No.: PCT/JP2014/082566
§ 371 (c)(1),
(2) Date: Mar. 20, 2017

(87) PCT Pub. No.: WO2016/047001
PCT Pub. Date: Mar. 31, 2016

(65) Prior Publication Data
US 2017/0282820 A1 Oct. 5, 2017

(30) Foreign Application Priority Data

Sep. 22, 2014 (JP) ................................. 2014-192972

(51) Int. Cl.
*B60R 16/03* (2006.01)
*H02J 7/00* (2006.01)
(Continued)

(52) U.S. Cl.
CPC .............. *B60R 16/03* (2013.01); *B60L 58/10* (2019.02); *B60R 16/04* (2013.01);
(Continued)

(58) Field of Classification Search
CPC ........................... B60R 16/03; H01M 10/052
(Continued)

(56) References Cited

U.S. PATENT DOCUMENTS

2012/0020136 A1* 1/2012 Akaishi ............... B60L 11/1851
363/131
2016/0111900 A1* 4/2016 Beaston ................ H02J 7/0021
320/134

FOREIGN PATENT DOCUMENTS

CN 1619915 A 5/2005
CN 103283108 A 9/2013
(Continued)

OTHER PUBLICATIONS

International Search Report (ISR) (and English translation thereof) and Written Opinion dated Mar. 3, 2015 issued in International Application No. PCT/JP2014/082566.

*Primary Examiner* — Richard V Muralidar
(74) *Attorney, Agent, or Firm* — Holtz, Holtz & Volek PC

(57) ABSTRACT

According to one embodiment, a vehicle-use storage battery system includes a storage battery, a main circuit, a circuit breaker, a storage battery management unit, a first determiner, and a second determiner. The main circuit is electrically connected to the storage battery. The circuit breaker is disposed between the storage battery and the main circuit to make or break the electrical connection therebetween. The (Continued)

storage battery management unit manages an operating state of the storage battery. The first determiner determines whether to break the electrical connection between the storage battery and the main circuit by means of the circuit breaker. The second determiner determines, on the basis of at least one of operating states of the storage battery management unit, the first determiner, and the circuit breaker, whether to break the electrical connection between the storage battery and the main circuit by means of the circuit breaker.

6 Claims, 3 Drawing Sheets

(51) Int. Cl.
*H01M 10/625* (2014.01)
*B60R 16/04* (2006.01)
*H01M 10/052* (2010.01)
*B60L 58/10* (2019.01)

(52) U.S. Cl.
CPC ....... *H01M 10/052* (2013.01); *H01M 10/625* (2015.04); *H02J 7/00* (2013.01); *Y02E 60/122* (2013.01); *Y02T 10/7011* (2013.01)

(58) Field of Classification Search
USPC .................................................. 320/134
See application file for complete search history.

(56) References Cited

FOREIGN PATENT DOCUMENTS

| | | |
|---|---|---|
| DE | 10058898 A1 | 5/2002 |
| EP | 1595748 A1 | 11/2005 |
| EP | 2695762 A2 | 2/2014 |
| JP | 2002374633 A | 12/2002 |
| JP | 2009035185 A | 2/2009 |
| JP | 2010118281 A | 5/2010 |
| JP | 2013195129 A | 9/2013 |
| JP | 2013240165 A | 11/2013 |
| JP | 2014171285 A | 9/2014 |

* cited by examiner

VEHICLE-USE STORAGE BATTERY SYSTEM

CROSS-REFERENCE TO RELATED APPLICATIONS

This application is national stage application of International Application No. PCT/JP2014/082566, filed Dec. 9, 2014, which designates the United States, incorporated herein by reference, and which claims the benefit of priority from Japanese Patent Application No. 2014-192972, filed Sep. 22, 2014, the entire contents of which are incorporated herein by reference.

FIELD

An embodiment described herein generally relates to a vehicle-use storage battery system.

BACKGROUND

Conventionally, a storage battery that is charged and discharged repeatedly is disconnected from a main circuit when an anomaly occurs such as over-discharging or over-charging, generation of excessive heat over an allowable value, or a fault in a control system that controls the storage battery. To immediately disconnect the storage battery from the main circuit, a circuit breaker is provided therebetween.

Storage batteries are used, for example, as a power source for driving a vehicle. Such storage batteries are installed in, for example, electric locomotives which run by a drive power source (motor) driven by electricity from the storage batteries, or installed in hybrid locomotives that include a motor and an engine as drive power sources. Storage batteries may be installed in automobiles such as electric cars and hybrid cars, trucks, and buses. Such in-vehicle storage batteries are used in a more vibrating environment for a longer period of time than stationary storage batteries. Similarly, controllers of the storage batteries and circuit breakers are likely to be used in a harsh environment. Thus, vehicle-use storage batteries tend to be required to implement a higher level of expected safety design and reliability than stationary storage batteries.

DETAILED DESCRIPTION

In general, according to one embodiment, a vehicle-use storage battery system comprises a storage battery, a main circuit, a circuit breaker, a storage battery management unit, a first determiner, and a second determiner, for example. The main circuit is electrically connected to the storage battery. The circuit breaker is disposed between the storage battery and the main circuit and makes or breaks electrical connection between the storage battery and the main circuit. The storage battery management unit manages an operating state of the storage battery. The first determiner determines whether to break the electrical connection between the storage battery and the main circuit by means of the circuit breaker. The second determiner determines, based on at least one of operating states of the storage battery management unit, the first determiner, and the circuit breaker, whether to break the electrical connection between the storage battery and the main circuit by means of the circuit breaker.

The following illustrative embodiment and modifications include like or same constituent elements. In the following like or same constituent elements are denoted by like or same reference signs, and overlapping explanations are omitted.

Figure 1:
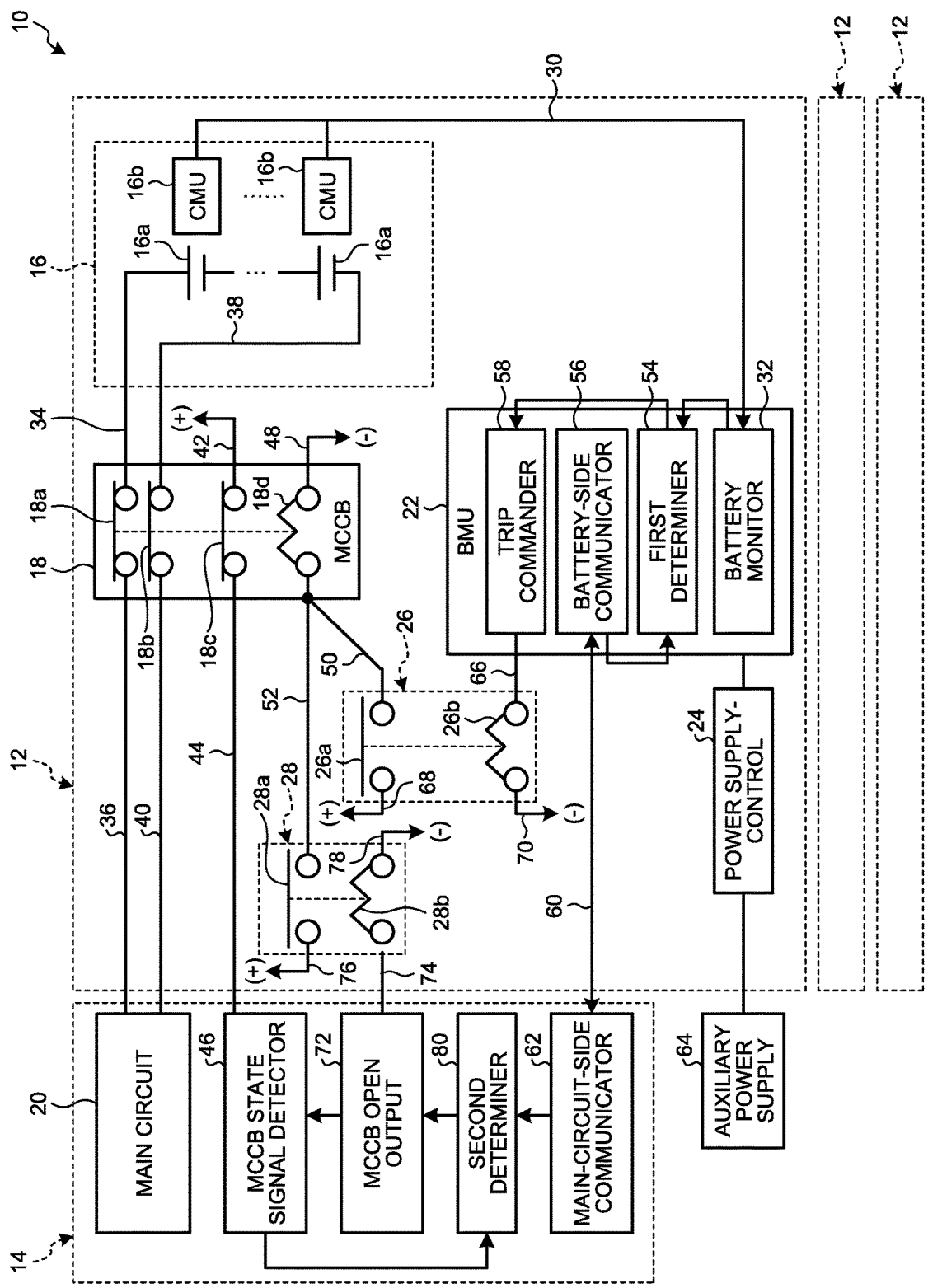
FIG. 1 is a block diagram illustrating a configuration of a vehicle-use storage battery system according to an embodiment.

FIG. 1 is a block diagram illustrating a configuration of a vehicle-use storage battery system 10 according to an embodiment. FIG. 1 mainly illustrates a configuration necessary for tripping a circuit breaker, and thus, illustration and description of the other configurations are omitted.

The vehicle-use storage battery system 10 includes a storage battery unit 12 and a main circuit unit 14. The storage battery unit 12 and the main circuit unit 14 are electrically connected to each other. A storage battery 16 is included in the storage battery unit 12 and connected to a main circuit 20 of the main circuit unit 14 via a molded case circuit breaker 18 (hereinafter referred to as an MCCB or a breaker). Thus, the MCCB 18 is opened to be able to substantially disconnect the storage battery unit 12 from the main circuit unit 14. The vehicle-use storage battery system 10 may include one storage battery unit 12, or may include, as illustrated in FIG. 1, two or more storage battery units 12 that are connected to a single main circuit unit 14. With use of two or more storage battery units 12, the storage battery units 12 are connected to the single main circuit unit 14 in parallel. In this configuration, if one or more of the storage battery units 12 are disconnected, the rest of the storage battery units 12 remain connected to the main circuit unit 14. In other words, with the MCCBs 18 closed, the main circuit 20 can normally control charging and discharging of the storage batteries 16 of the storage battery units 12 while electrically connected to the main circuit unit 14. With use of the vehicle-use storage battery system 10 in a railway vehicle, for example, disconnecting one or more of the storage battery units 12 having an anomaly from the main circuit unit 14 does not affect the railway vehicle running, and the railway vehicle can continue to run by the storage batteries 16 of the rest of the storage battery units 12. Furthermore, disconnection of the storage battery units 12 as considered to have anomaly from the other normal storage battery units 12 can prevent the non-normal storage battery units 12 from damaging the normal storage battery units 12.

Each of the storage battery units 12 includes the storage battery 16, the MCCB 18, a battery management unit 22 (hereinafter referred to as a BMU or a storage battery management unit), a power supply control 24, a first relay 26, and a second relay 28.

The storage battery 16 includes, for example, battery cells (electric cells, cell units, cells) 16a that are connected in series or in parallel. The battery cells 16a can be configured as, for example, lithium-ion secondary batteries. The battery cells 16a may be other secondary batteries such as nickel-hydrogen batteries, nickel-cadmium batteries, or lead storage batteries. The storage batteries 16 each include cell monitoring units (CMUs) 16b that detect the voltage and temperature of the corresponding battery cells 16a to implement voltage and temperature monitoring functionality.

Each CMU 16b detects the voltage and temperature of the corresponding battery cell 16a in a certain detection cycle to provide them to a battery monitor 32 of the BMU 22 connected via a CMU wire 30. FIG. 1 illustrates the serial connection of the battery cells 16a, for example. To increase battery capacity, the storage battery 16 may include battery cell groups connected in parallel, each battery cell group including battery cells connected in series as illustrated in FIG. 1.

The positive terminal of one of the serially connected battery cells 16a at one end is connected to one end of a positive movable contact 18a of the MCCB 18 via a positive wire 34. The other end of the positive movable contact 18a is connected to the positive terminal (not illustrated) of the main circuit 20 via a main circuit positive wire 36. The negative terminal of one of the serially connected battery cells 16a at the other end is connected to one end of a negative movable contact 18b of the MCCB 18 via a negative wire 38. The other end of the negative movable contact 18b is connected to the negative terminal (not illustrated) of the main circuit 20 via a main circuit negative wire 40. The positive movable contact 18a and the negative movable contact 18b of the MCCB 18 are normally closed movable contacts, and electrically connect the main circuit 20 with the storage battery 16 in normal operation. The positive movable contact 18a and the negative movable contact 18b are opened when, for example, over-discharging through the storage battery 16, an operator manually opens the contacts, or a trip voltage is applied to an MCCB coil 18d to be described later. Thereby, the MCCB 18 breaks (releases) the electrical connection between the storage battery 16 and the main circuit 20. In other words, by the opening of the MCCB 18, the storage battery unit 12 including the MCCB 18 is disconnected from the main circuit unit 14. The MCCB 18 includes a detection contact 18c that is opened or closed simultaneously with the opening or closing of the positive movable contact 18a and the negative movable contact 18b. The MCCB 18 also includes the MCCB coil 18d that causes the positive movable contact 18a and the negative movable contact 18b to open and causes the detection contact 18c to open, for example, when applied with voltage (trip voltage). In other words, the MCCB 18 includes three normally closed movable contacts (positive movable contact 18a, negative movable contact 18b, and detection contact 18c) and the MCCB coil 18d that collectively operates these contacts.

One end of the detection contact 18c is connected to the positive terminal (+) of the power supply control 24 via a power supply wire 42, and the other end thereof is connected to an MCCB state signal detector 46 included in the main circuit unit 14 via a detection wire 44. Further details of the MCCB state signal detector 46 will be described later. One end of the MCCB coil 18d is connected to the ground (−) via a ground wire 48, and the other end thereof is connected to a movable contact 26a of the first relay 26 via a first relay wire 50 and to a movable contact 28a of the second relay 28 via a second relay wire 52.

The BMU 22 includes, for example, the battery monitor 32, a first determiner 54, a battery-side communicator 56, and a trip commander 58. The battery monitor 32 receives results of detection from the CMUs 16b of the storage battery 16 via the CMU wire 30 and provides them to the first determiner 54. The first determiner 54 determines whether to break the electrical connection between the storage battery 16 and the main circuit 20 on the basis of an operation state of each battery cell 16a provided from the battery monitor 32. For example, the first determiner 54 performs anomaly determination when, for example, the battery cells 16a are over-discharged or overcharged, the temperature of the battery cells 16a increases over a certain threshold, or any non-normal CMU 16b or inactivated CMU 16b is detected. The first determiner 54 then determines that it is difficult to maintain normal control over the storage battery 16 including a non-normal battery cell 16a or a non-normal CMU 16b. Then, the first determiner 54 determines to disconnect, from the main circuit 20, the storage battery 16 as determined as difficult to control.

The battery-side communicator 56 is connected to the first determiner 54. The first determiner 54 determines whether to break the electrical connection between the storage battery 16 and the main circuit 20 on the basis of the state or content of communication with the main circuit unit 14 provided by the battery-side communicator 56. The battery-side communicator 56 is connected to a main-circuit-side communicator 62 via a communication wire 60. The battery-side communicator 56 notifies the first determiner 54 of establishment or non-establishment of communication with the main-circuit-side communicator 62. For example, when the battery-side communicator 56 and the main-circuit-side communicator 62 have not established communication, there may be an anomaly (fault) in the main circuit unit 14 or a breaking of the communication wire 60, or at least one of the battery-side communicator 56 and the main-circuit-side communicator 62 may have an anomaly in the transmission function or reception function. In view of this, the battery-side communicator 56 notifies the first determiner 54 of non-establishment of communication with the main-circuit-side communicator 62. The first determiner 54 determines that the storage battery unit 12 (storage battery 16), which includes the battery-side communicator 56 having failed in establishing the communication due to an anomaly in the main circuit unit 14 or the communication wire 60, can be no longer normally controlled. In other words, the first determiner 54 determines to disconnect, from the main circuit 20, the storage battery unit 12 (storage battery 16) as determined as difficult to control. When two or more storage battery units 12 are connected to the main circuit unit 14 and have not established communication therebetween due to an anomaly in, for example, the main circuit unit 14, the first determiner 54 in the BMU 22 of each storage battery unit 12 can control the corresponding MCCB 18 to open. In other words, all the storage battery units 12 can be disconnected from the main circuit unit 14. When, for example, the main circuit unit 14 is in a normal state but has an anomaly in the communication function with a certain storage battery unit 12, or when it has lost communication with a certain storage battery unit 12 due to breaking of the communication wire 60, the first determiner 54 also determines that the certain storage battery unit 12 has anomaly. The first determiner 54 can control, to open, only the MCCB 18 of the storage battery unit 12 including a broken communication wire 60 or the battery-side communicator 56 that exhibits non-normal communication. Thereby, only the storage battery unit 12 that exhibits anomaly can be disconnected from the main circuit unit 14. While the main-circuit-side communicator 62 and the battery-side communicator 56 establish communication therebetween, the first determiner 54 can control the MCCB 18 to open according to an instruction from the main circuit unit 14. For example, when a storage battery unit 12 having an anomaly found cannot be disconnected from the main circuit unit 14, all the normal storage battery units 12 can be disconnected from the main circuit unit 14 to protect them.

When determining the necessity of breaking the MCCB 18, the first determiner 54 provides a trip command (open command, break command) to the trip commander 58. The trip commander 58 outputs a trip voltage (open signal, break signal) to the first relay 26 in accordance with the trip command from the first determiner 54. Detailed operation of the first relay 26 will be described later.

The power supply control 24 steps down a voltage supplied from an auxiliary power supply 64, for example, to supply drive power to, for example, the BMU 22, the MCCB 18, the first relay 26, and the second relay 28. The auxiliary power supply 64 is intended to supply power for applications other than drive power for the vehicle running, for example. The power is voltage-adjusted as appropriate and used in devices installed in the vehicle such as an air-conditioner, various displays, and lighting devices in addition to the above applications.

The first relay 26 is what is called a normally opened relay, and its movable contact 26a is closed when applied with a trip voltage at an end of a first relay coil 26b from the trip commander 58 in the BMU 22 via a first coil wire 66. As described above, one end of the movable contact 26a is connected to the MCCB coil 18d and the other end of the movable contact 26a is connected to the positive terminal (+) of the power supply control 24 via a power supply wire 68. Thus, by closing the movable contact 26a, voltage is applied to the MCCB coil 18d of the MCCB 18, thereby opening the positive movable contact 18a and the negative movable contact 18b and opening the detection contact 18c. In other words, the MCCB 18 is opened by the command from the BMU 22 to disconnect the storage battery 16 from the main circuit 20 (self-breaking). The other end of the first relay coil 26b is connected to the ground (−) via a ground wire 70.

The second relay 28 is what is called a normally opened relay, and its movable contact 28a is closed when applied with a trip voltage at an end of a second relay coil 28b from a later-described MCCB open output 72 via a second coil wire 74. As described above, one end of the movable contact 28a is connected to the MCCB coil 18d and the other end of the movable contact 28a is connected to the positive terminal (+) of the power supply control 24 via a power supply wire 76. Thus, by closing the movable contact 28a, voltage is applied to the MCCB coil 18d of the MCCB 18, thereby opening the positive movable contact 18a and the negative movable contact 18b and opening the detection contact 18c. In other words, the MCCB 18 is opened in response to the command from the main circuit unit 14 to disconnect the storage battery 16 from the main circuit 20 (self-breaking). The other end of the second relay coil 28b is connected to the ground (−) via a ground wire 78.

The main circuit unit 14 includes the main circuit 20, the MCCB state signal detector 46, the main-circuit-side communicator 62, the MCCB open output 72, and a second determiner 80. The main circuit 20 includes a converter and an inverter for mainly controlling the driving power for the vehicle. The main circuit 20 also includes motor control algorithms, for example.

The MCCB state signal detector 46 acquires a state detection signal based on the open or closed state (conduction state) of the detection contact 18c via the detection wire 44. The state detection signal is indicative of whether the detection contact 18c is closed. For example, while the detection contact 18c is closed, the MCCB state signal detector 46 can acquire a state detection signal. In other words, the MCCB state signal detector 46 can determine that the MCCB 18 is in a closed circuit state. While the detection contact 18c is opened or during signal interruption due to, for example, breaking of the detection wire 44, the state detection signal is not detected by the MCCB state signal detector 46. In other words, the MCCB state signal detector 46 can determine that the MCCB 18 is in an open circuit state or that the detection wire 44 is broken. The MCCB state signal detector 46 provides the second determiner 80 with information on whether it has acquired a state detection signal. The second determiner 80 determines, on the basis of information (data) provided from, for example, the MCCB state signal detector 46 or the main-circuit-side communicator 62, whether to break the electrical connection between the storage battery 16 and the main circuit 20 in response to a command from the main circuit unit 14.

Described here is an example of determining to break the electrical connection between the storage battery 16 and the main circuit 20 by a command from the second determiner 80 of the main circuit unit 14. Suppose that, for example, the second determiner 80 acquires, through the communication between the main-circuit-side communicator 62 and the battery-side communicator 56, information (data) indicating no output of the trip command (trip voltage) from the BMU 22. If the MCCB state signal detection unit 46 has not acquired a state detection signal, that is the same thing as the second determiner 80 acquires information (data) indicating the opening of the detection contact 18c (opening of MCCB 18). In other words, the information (data) acquired by the MCCB state signal detector 46 is conflicted with the control state of the BMU 22. This conflict may be due to, for example, breaking of the detection wire 44. Breaking of the detection wire 44 may not largely affect the control of the storage battery 16. However, to ensure safer operation of the storage battery 16, the second determiner 80 determines to break the electrical connection between the storage battery 16 and the main circuit 20 according to a command from the main circuit unit 14.

Suppose that the second determiner 80 acquires, through the communication between the main-circuit-side communicator 62 and the battery-side communicator 56, information (data) indicating the output of the trip command (trip voltage) from the BMU 22. If the second determiner 80 acquires, from the MCCB state signal detector 46, a state detection signal indicating the closing of the detection contact 18c (non-opening of the MCCB 18), the information (data) acquired by the MCCB state signal detector 46 is conflicted with the control state of the BMU 22. This conflict may be caused by breaking of the first coil wire 66 or an anomaly in the first relay 26. In this case, to ensure safer operation of the storage battery 16, the second determiner 80 determines to break the connection between the storage battery 16 and the main circuit 20 by a command from the main circuit unit 14.

Under no communication established between the main-circuit-side communicator 62 and the battery-side communicator 56, the second determiner unit 80 suspects breaking of the communication wire 60 or an anomaly in the BMU 22. Similarly, in this case, to ensure safer operation of the storage battery 16, the second determiner 80 determines to break the electrical connection between the storage battery 16 and the main circuit 20 according to a command from the main circuit unit 14.

As described above, the vehicle-use storage battery system 10 according to the present embodiment can control the MCCB 18 to open by way of dual commands, i.e., an open command from the BMU 22 via the first relay 26 and an open command from the main circuit unit 14 via the second relay 28. Thereby, with occurrence of an anomaly in the storage battery 16, the BMU 22 can individually disconnect a target storage battery unit 12 from the main circuit 20 of the main circuit unit 14. Furthermore, even when an anomaly occurs in the storage battery unit 12 including the BMU 22, the storage battery unit 12 having the anomaly can be individually disconnected from the main circuit 20 of the main circuit unit 14 by a command from the main circuit unit 14 without using the BMU 22. In other words, the storage battery unit 12 having the anomaly can be disconnected from the main circuit unit 14 without fail. Thereby, for example, in the case of an anomaly in any of multiple storage battery units 12 connected to a single main circuit unit 14, only the storage battery unit 12 concerned can be disconnected from the main circuit unit 14 without fail. The main circuit unit 14 can allow, for example, a railroad vehicle to continue to run using the remaining normal storage battery units 12 alone. Moreover, the storage battery unit 12 having an anomaly can be immediately disconnected from the vehicle-use storage battery system 10, which can prevent the storage battery unit 12 having the anomaly from damaging the other normal storage battery units 12. Thus, the vehicle-use storage battery system 10 can be maintained.

Figure 2:
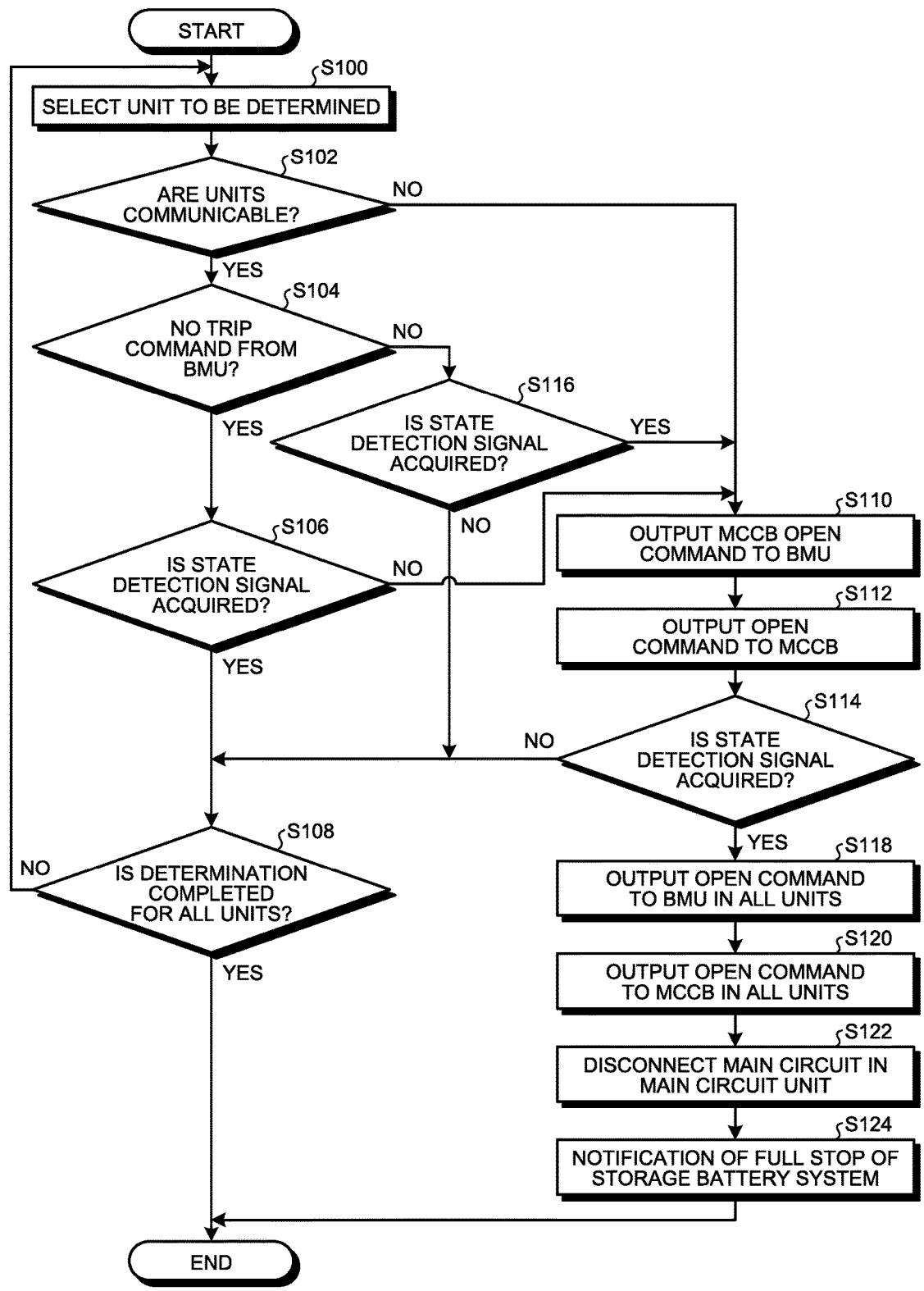
FIG. 2 is a flowchart of anomaly determination process performed in the vehicle-use storage battery system according to the embodiment.

FIG. 2 is a flowchart of the anomaly determination process performed in the vehicle-use storage battery system 10 according to the present embodiment configured as above. In the anomaly determination process illustrated in FIG. 2, the vehicle-use storage battery system 10 includes a number of storage battery units 12 connected to a single main circuit unit 14. Described by way of example is an anomaly determination on the storage battery units in order during normal operation of the vehicle-use storage battery system 10. The vehicle-use storage battery system 10 repeats the process in the flowchart illustrated in FIG. 2 in a certain control cycle. In the present embodiment, to facilitate understanding of the anomaly determination procedure, the anomaly determination in the flowchart of FIG. 2 is performed under the assumption that an anomaly that may possibly occur in the storage battery units 12 will not occur in different locations in the same unit at the same time (an anomaly may occur only in a single location of one unit).

First, the second determiner 80 selects a storage battery unit 12 as a subject of the determination at current timing (S100). The second determiner 80 then determines whether the main-circuit-side communicator 62 can communicate with the battery-side communicator 56 of the storage battery unit 12 (S102). If the main-circuit-side communicator 62 and the battery-side communicator 56 of the storage battery unit 12 have established communication (Yes at S102), the second determiner unit 80 determines from the content of the communication whether a trip command has been output from the BMU 22 (trip commander 58) of the storage battery unit 12 (S104). With no trip command output from the BMU 22 (trip commander 58) (Yes at S104), the second determiner 80 determines whether a state detection signal has been acquired via the MCCB state signal detection unit 46 (S106). Having acquired a state detection signal from the storage battery unit 12 (Yes at S106), that is, upon determining that the MCCB 18 is in a closed circuit state, the second determiner 80 determines that the control by the BMU 22 is consistent with the result of detection by the MCCB state signal detector 46. Thus, the second determiner 80 determines that the storage battery unit 12 is operating in a normal state. Subsequently, the second determiner 80 ends the anomaly determination on the currently selected storage battery unit 12. If the anomaly determination has not been completed for all the storage battery units 12 (No at S108), the second determiner 80 returns to S100 and starts the anomaly determination for the next storage battery unit 12. If the anomaly determination has been completed for all the storage battery units 12 (Yes at S108), this procedure is temporarily stopped. At the next timing for anomaly determination, the second determiner 80 starts from S100.

At S102, if the main-circuit-side communicator 62 cannot communicate with the battery-side communicator 56 (not established) (No at S102), the second determiner 80 determines to disconnect the storage battery unit 12 concerned from the main circuit unit 14. This communication failure between the main-circuit-side communicator 62 and the battery-side communicator 56 may be caused by breaking of the communication wire 60. Alternatively, the communication failure may be due to a fault only in the reception function of the main-circuit-side communicator 62, or due to a fault only in the transmission function of the battery-side communicator 56. In such cases, the main circuit unit 14 may be able to instruct the BMU 22 to output the trip command. The second determiner 80 thus implements all possible means to disconnect the storage battery unit 12 that may have anomaly in the system, from the main circuit unit 14 without fail. In other words, the second determiner 80 outputs an open command to the BMU 22 to open the MCCB 18 (S110). In addition, the second determiner 80 controls the MCCB open output 72 to output an open command to the MCCB 18 of the storage battery unit 12 concerned (S112). That is, the MCCB open output 72 applies a trip voltage to the second relay coil 28b of the second relay 28. The second determiner 80 then determines whether the MCCB state signal detector 46 can no longer acquire the state detection signal, which has been successfully acquired, after the output of the open command from the BMU 22 or the trip voltage applied from the MCCB open output 72 to the second relay coil 28b (S114). If the MCCB state signal detector 46 fails to acquire the state detection signal (No at S114), the second determiner 80 determines that the storage battery unit 12 determined to be non-normal has been successfully disconnected from the main circuit unit 14, and then performs the processing at S108. That is, the second determiner 80 ends the anomaly determination for the currently selected storage battery unit 12. If the anomaly determination has not been completed for all the storage battery units 12 (No at S108), the second determiner 80 returns to S100 and starts the anomaly determination for the next storage battery unit 12. If the anomaly determination is performed for all the storage battery units 12 (Yes at S108), this procedure is temporarily stopped. At the next anomaly determination timing, the second determiner 80 starts from S100.

If the trip command has been output from the BMU 22 (trip commander 58) at S104 (No at S104), the MCCB 18 has to be in an open circuit state. The second determiner 80 determines whether the MCCB state signal detector 46 can no longer acquire the state detection signal, which has been successfully acquired (S116). If the MCCB state signal detector 46 fails to acquire the state detection signal (No at S116), the second determiner 80 determines that the storage battery unit 12 determined as having an anomaly has been successfully disconnected from the main circuit unit 14, and performs the processing at S108. That is, the second determiner 80 ends the anomaly determination for the currently selected storage battery unit 12. If the anomaly determination has not been completed for all the storage battery units 12 (No at S108), the second determiner 80 returns to S100 and starts the anomaly determination for the next storage battery unit 12. Upon completion of the anomaly determination for all the storage battery units 12 (Yes at S108), this procedure is temporarily stopped. At the next anomaly determination timing, the second determiner 80 starts from S100.

If the MCCB state signal detector 46 has acquired the state detection signal at S116 (Yes at S116), that means that the MCCB 18 is in a closed circuit state (non-open state) despite the trip command output from the BMU 22. Thus, the information (data) acquired by the MCCB state signal detector 46, that is, what the state detection signal indicates, is conflicted with the control state of the BMU 22. This conflict may be caused by, for example, breaking of the first coil wire 66 or the ground wire 70. Also in this case, the second determiner 80 determines that the storage battery unit 12 possibly has an anomaly, and proceeds to S110. The second determiner 80 performs the processing at and after S110 to implement all possible means to disconnect the storage battery unit 12 that possibly has an anomaly in the system, from the main circuit unit 14 without fail.

If the MCCB state signal detector 46 fails to acquire the state detection signal at S106 despite no trip command output from the BMU 22 (No at S106), breaking of the detection wire 44 may be suspected, for example. Also in this case, the second determiner 80 determines that the storage battery unit 12 possibly has an anomaly, and proceeds to S110. The second determiner 80 performs the processing at and after S110 to implement all possible means to disconnect the storage battery unit 12 that possibly has an anomaly in the system, from the main circuit unit 14 without fail.

If the MCCB state signal detector 46 detects a state detection signal at S114 despite the open command output at S112 to the MCCB 18 of the storage battery unit 12 (Yes at S114), the disconnection of the storage battery unit 12 is considered to end up in a failure. In this case, the second determiner 80 disconnects all the storage battery units 12 from the main circuit unit 14 to prevent the storage battery unit 12 determined to be non-normal from damaging the other normal storage battery units 12 via the main circuit unit 14. Thus, the main circuit unit 14 outputs an open command for the MCCB 18 to the BMUs 22 of all the storage battery units 12 via the communication wire 60 (S118). In addition, the second determiner 80 causes the MCCB open output 72 to output an open command to the MCCBs 18 of all the storage battery units 12 (S120). As a result, all the storage battery units 12 except the storage battery unit 12 having failed to be disconnected are disconnected from the main circuit unit 14 without fail. The second determiner 80 breaks the main circuit 20 in the main circuit unit 14, to protect the main circuit 20 from the failed storage battery unit 12 (S122). In other words, the main circuit 20 is prevented from being damaged by the storage battery unit 12 considered as non-normal and having failed to be disconnected. The second determiner 80 issues a full stop of the vehicle-use storage battery system 10 through a display or an indicator light (S124), and ends the procedure.

If the MCCB state signal detector 46 has failed to acquire the state detection signal at S106, the second determiner 80 proceeds to S110. After open commands are output from the BMU 22 and from the main circuit unit 14, the second determiner 80 determines again whether the MCCB state signal detector 46 can acquire the state detection signal. When transitioning from S106 to S110, the main-circuit-side communicator 62 and the battery-side communicator 56 have established their communication although a breakage of the detection wire 44 is suspected, and thus, the open operation is regarded as completed in response to either the open command from the BMU 22 or the open command from the main circuit unit 14. In other words, when proceeding from S106 to S110, through the processing at S110 and S112 disconnection of the storage battery unit 12 determined to be non-normal from the main circuit unit 14 is regarded as successful as an exception (the state detection signal is regarded as not acquired), and the second determiner 80 proceeds to S108 and performs the subsequent processing.

Figure 3:
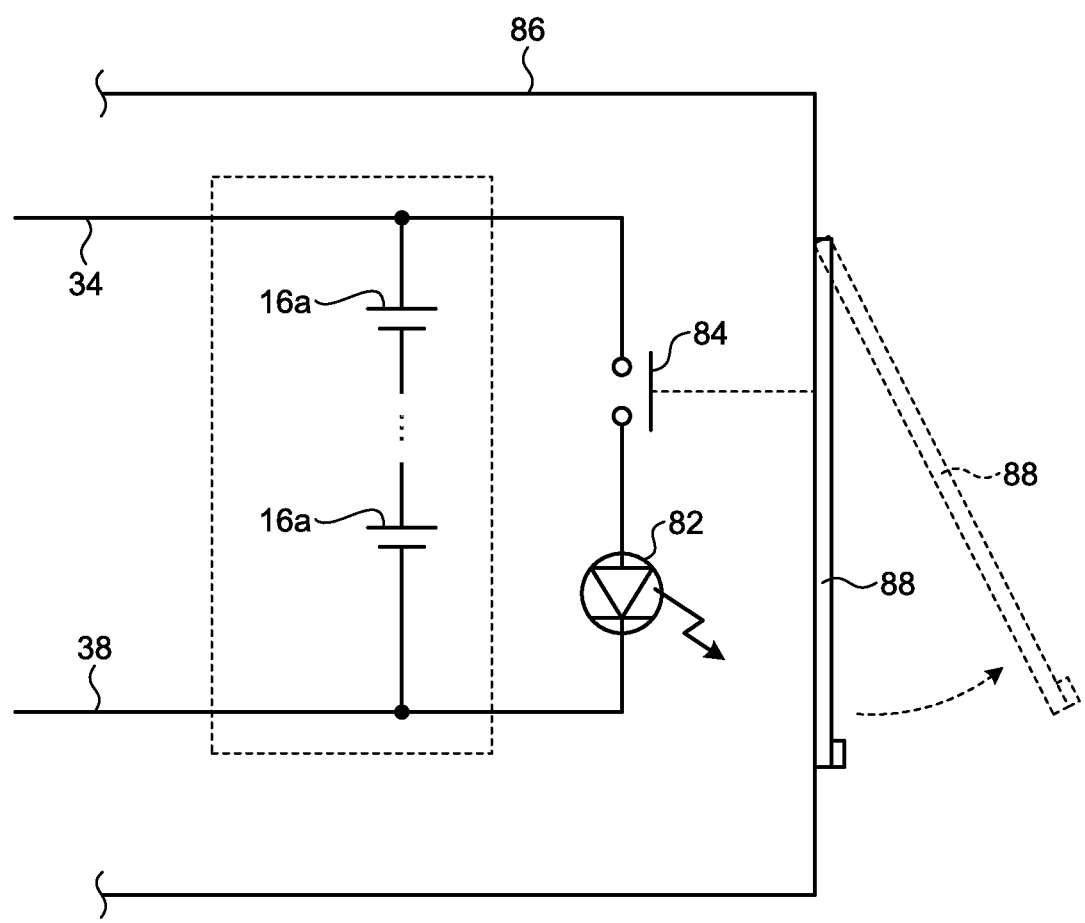
FIG. 3 is a diagram illustrating an example of connection between an indicator light and a mechanical switch disposed in a storage box that accommodates a storage battery of the vehicle-use storage battery system according to the embodiment.

As for the storage battery 16 used in the vehicle-use storage battery system 10 according to the present embodiment, in terms of safety design, the storage battery unit 12 is disconnected from the main circuit unit 14 in the case of anomaly as described above. In addition, the vehicle-use storage battery system 10 includes an indicator light 82, as illustrated in FIG. 3, as means for alerting a worker who performs maintenance and inspection of the vehicle-use storage battery system 10 (storage battery 16). The indicator light 82 is turned on when the worker accesses the storage battery 16 regardless of whether the storage battery module 12 is disconnected. This indicator light 82 is connected in parallel with the storage battery 16. A normally opened mechanical switch 84 is directly connected to the indicator light 82. The mechanical switch 84 is disposed to electrically connect the indicator light 82 with the storage battery 16 when a door 88 of a storage box 86 accommodating the storage battery 16 is opened. By such disposition of the indicator light 82 and the mechanical switch 84, the indicator light 82 does not need to use electricity from, for example, the auxiliary power supply 64, and the indicator light 82 can be turned on without fail upon opening of the door 88 when the worker has to pay attention. With the door 88 closed to inhibit direct access to the storage battery 16, the indicator light 82 is turned off, whereby unnecessary discharging of the storage battery 16 can be prevented.

As described above, the vehicle-use storage battery system 10 according to the present embodiment includes the storage battery 16, the main circuit 20 that is electrically connected to the storage battery 16, the MCCB (circuit breaker) 18 disposed between the storage battery 16 and the main circuit 20 to make or break the electrical connection therebetween, the BMU (storage battery management unit) 22 that manages the operating state of the storage battery 16, the first determiner 54 that determines whether to break the electrical connection between the storage battery 16 and the main circuit 20 by means of the MCCB 18, and the second determiner 80 that determines, on the basis of at least one of operating states of the BMU 22, the first determiner 54, and the MCCB 18, whether to break the electrical connection between the storage battery 16 and the main circuit 20 by means of the MCCB 18. By this configuration, the opening of the MCCB 18 can be implemented according to dual break commands (open commands) from the BMU 22 and the main circuit 20, for example. Thus, when an anomaly occurs in the storage battery 16, the storage battery 16 having the anomaly can be disconnected from the main circuit 20 without fail.

The vehicle-use storage battery system 10 according to the embodiment may include the first relay 26 that closes circuit to control the MCCB 18 to open in accordance with a determination result of the first determiner 54, and the second relay 28 that closes circuit to control the MCCB 18 to open in accordance with a determination result of the second determiner 80. Thereby, a simple and solid dual circuit breaker can be easily configured for disconnecting, for example, the storage battery 16 from the main circuit 20.

The vehicle-use storage battery system 10 according to the embodiment includes the main circuit unit 14 including the main circuit 20 and the second determiner 80, and includes the storage battery unit 12 including the storage battery 16, the MCCB 18, the BMU 22, and the first determiner 54. Two or more storage battery units 12 can be connected to the main circuit unit 14 and individually disconnected therefrom by at least one of the first determiner 54 and the second determiner 80. With this configuration, for example, in the case of an anomaly in one or more of the storage battery units 12, the one or more storage battery units 12 having the anomaly can be disconnected from the main circuit unit 14 without fail. For another example, with use of the vehicle-use storage battery system 10 in a railway vehicle, even when one or more of the storage battery units 12 with an anomaly are disconnected from the main circuit unit 14, the storage batteries 16 of the remaining storage battery units 12 can keep the railway vehicle running. Furthermore, the storage battery units 12 regarded as non-normal are disconnected from the other normal storage battery units 12 to thereby prevent the non-normal storage battery units 12 from damaging the normal storage battery units 12.

The main circuit unit 14 of the vehicle-use storage battery system 10 according to the embodiment includes, for example, the main-circuit-side communicator 62, and the storage battery unit 12 thereof includes the battery-side communicator 56 that communicates with the main-circuit-side communicator 62. Under no communication established between the main-circuit-side communicator 62 and the battery-side communicator 56, at least one of the first determiner 54 and the second determiner 80 may control the MCCB 18 of the storage battery unit 12 having failed to establish communication to perform open operation. When, for example, the main circuit unit 14 and the storage battery unit 12 lose communication link and cannot transfer information (data) smoothly, the storage battery unit 12 having lost communication link can be disconnected from the main circuit unit 14 to secure safety of the system reliably.

In the vehicle-use storage battery system 10 according to the embodiment, when acquiring, through the communication between the main-circuit-side communicator 62 and the battery-side communicator 56, a signal indicating that the first determiner 54 has determined to open the MCCB 18, but detecting no opening of the MCCB 18, the second determiner 80 may control the MCCB 18 in question of a storage battery unit 12 to open, the MCCB 18 determined to be opened by the first determination unit 54. With this configuration, even if the MCCB 18 cannot be opened from the BMU 22, the MCCB 18 can be opened from the main circuit unit 14 without fail, which can ensure safety of the system, for example.

The MCCB 18 of the vehicle-use storage battery system 10 according to the embodiment includes, for example, the detection contact 18c that switches between open and closed states in accordance with switching of the open and closed states of the MCCB 18. The second determiner 80 may be configured to detect the open or closed state of the BMU 22 based on non-conducting or conducting of the detection contact 18c. When the detection contact 18c is in a non-conducting state, the second determiner 80 may cause the MCCB 18 of a storage battery unit 12 to open, the MCCB 18 including the non-conducting detection contact 18c. According to this configuration, even when the main circuit unit 14 cannot determine the operating state of the BMU 22, it can control the MCCB 18 to open without fail, which can ensure safety of the system, for example.

The vehicle-use storage battery system 10 according to the embodiment may include, for example, the indicator light 82 that is connected in parallel with the storage battery 16, and the mechanical switch 84 that is directly connected to the indicator light 82 to electrically connect the indicator light 82 with the storage battery 16 when the door 88 of the storage box 86 that accommodates the storage battery 16 is opened. By this configuration, the indicator light 82 can be turned on without fail while the door 88 of the storage box 86 accommodating the storage battery 16 is opened, helping the worker pay attention to the storage battery 16. The indicator light 82 is turned off while the door 88 is closed to inhibit direct access to the storage battery 16, thereby preventing unnecessary discharging of the storage battery 16.

Although the embodiment above mainly describes the break command transmitted between the main circuit unit and the storage battery unit, the break command can be transmitted between a train control and monitoring system (TCMS) and the storage battery unit from the TCMS to the MCCB of the storage battery unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A vehicle-use storage battery system comprising:
a storage battery;
a main circuit that is electrically connected to the storage battery;
a circuit breaker that is disposed between the storage battery and the main circuit and makes or breaks electrical connection between the storage battery and the main circuit;
a storage battery management unit that manages an operating state of the storage battery;
a first determiner that determines whether to break the electrical connection between the storage battery and the main circuit by the circuit breaker;
a second determiner that determines, based on at least one of operating states of the storage battery management unit, the first determiner, and the circuit breaker, whether to break the electrical connection between the storage battery and the main circuit by the circuit breaker;
a main circuit unit including the main circuit and the second determiner, and
a storage battery unit including the storage battery, the circuit breaker, the storage battery management unit, and the first determiner,
wherein:
the storage battery unit includes storage battery units,
the storage battery units are connected to the main circuit unit, and
at least one of the first determiner and the second determiner can individually disconnect the storage battery units from the main circuit unit.

2. The vehicle-use storage battery system according to claim 1, further comprising:
a first relay that is closed to control the circuit breaker to open in accordance with a result of the determination of the first determiner; and a second relay that is closed to control the circuit breaker to open in accordance with a result of the determination of the second determiner.

3. The vehicle-use storage battery system according to claim 1, wherein:
the main circuit unit includes a main-circuit-side communicator,
the storage battery unit includes a battery-side communicator that communicates with the main-circuit-side communicator, and
when the main-circuit-side communicator and the battery-side communicator have not established communication, at least one of the first determiner and the second determiner controls the circuit breaker of the storage battery unit having not established communication to open.

4. The vehicle-use storage battery system according to claim 3, wherein, when the second determiner receives, through the communication between the main-circuit-side communicator and the battery-side communicator, a signal indicating that the first determiner has determined to open the circuit breaker, and detects no opening of the circuit breaker, the second determiner controls the circuit breaker of the storage battery unit to open, the circuit breaker determined to be opened by the first determiner.

5. The vehicle-use storage battery system according to claim 3, wherein:
the circuit breaker includes a detection contact that switches between open and closed states in accordance with switching of the circuit breaker between open and closed states,
the second determiner detects an open or closed state of the circuit breaker based on a non-conducting or conducting state of the detection contact, and
when the detection contact is in the non-conducting state, the second determiner controls the circuit breaker of the storage battery unit to open, the circuit breaker including the non-conducting detection contact.

6. The vehicle-use storage battery system according to claim 1, further comprising:
an indicator light that is connected in parallel with the storage battery; and
a mechanical switch that is directly connected to the indicator light and electrically connects the storage battery and the indicator light when a door of a storage box accommodating the storage battery is opened.

* * * * *